(12) United States Patent
Nakajima

(10) Patent No.: US 10,802,470 B2
(45) Date of Patent: Oct. 13, 2020

(54) CONTROL SYSTEM

(71) Applicant: FANUC CORPORATION, Minamitsuru-gun, Yamanashi (JP)

(72) Inventor: Masatoshi Nakajima, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 102 days.

(21) Appl. No.: 16/181,663

(22) Filed: Nov. 6, 2018

(65) Prior Publication Data

US 2019/0146459 A1 May 16, 2019

(30) Foreign Application Priority Data

Nov. 10, 2017 (JP) ................................. 2017-217392

(51) Int. Cl.
G05B 19/4155 (2006.01)
H04L 29/08 (2006.01)
G05B 19/418 (2006.01)

(52) U.S. Cl.
CPC ..... *G05B 19/4155* (2013.01); *G05B 19/4186* (2013.01); *H04L 67/32* (2013.01); *G05B 2219/31205* (2013.01); *G05B 2219/33244* (2013.01); *G05B 2219/34376* (2013.01); *H04L 67/12* (2013.01)

(58) Field of Classification Search
CPC ...... G05B 19/4155; G05B 2219/34376; G05B 2219/33244; G05B 2219/31205; G05B 19/4186; H04L 67/32; H04L 67/12
See application file for complete search history.

(56) References Cited

U.S. PATENT DOCUMENTS

| | | | |
|---|---|---|---|
| 10,122,600 B1* | 11/2018 | Hutz | H04L 67/12 |
| 2014/0067902 A1* | 3/2014 | Wang | H04W 4/70 709/201 |
| 2014/0129688 A1* | 5/2014 | Asenjo | H04L 41/046 709/221 |
| 2014/0336795 A1* | 11/2014 | Asenjo | G06Q 10/06 700/86 |
| 2014/0337429 A1* | 11/2014 | Asenjo | H04L 67/306 709/204 |
| 2014/0359035 A1* | 12/2014 | Wang | H04L 51/06 709/206 |

(Continued)

FOREIGN PATENT DOCUMENTS

| | | |
|---|---|---|
| JP | 11338541 A | 12/1999 |
| JP | 2002366355 A | 12/2002 |
| JP | 2015184987 A | 10/2015 |

OTHER PUBLICATIONS

Japanese Notice of Reasons for Refusal for Japanese Application No. 2017-217392, dated Jan. 7, 2020, with translation, 6 pages.

*Primary Examiner* — Christopher E. Everett
(74) *Attorney, Agent, or Firm* — RatnerPrestia

(57) ABSTRACT

A control system is mounted with a function of transmitting/receiving a plurality of types of data together. If a plurality of data acquisition requests are made, the system creates a single grouping request by grouping the individual data acquisition requests. The grouping request is transmitted by a single communication session, and a device having received the grouping request acquires a plurality of pieces of data in response to the plurality of data acquisition requests included in the received request, creates the result of grouping of the acquired data, and transmits the result as a response to the grouping request.

5 Claims, 4 Drawing Sheets

(56) References Cited

U.S. PATENT DOCUMENTS

2015/0009818 A1* 1/2015 Xiao .................. H04W 4/08
 370/230.1
2015/0277411 A1 10/2015 Nakajima et al.

* cited by examiner

EXAMPLE OF PROGRAM EXECUTED ON MANAGEMENT DEVICE

CONTROL SYSTEM

CROSS-REFERENCE TO RELATED APPLICATION

This application is a new U.S. patent application that claims benefit of Japanese Patent Application No. 2017-217392 filed Nov. 10, 2017, the disclosure of this application is being incorporated herein by reference in its entirety for all purposes.

FIELD OF THE INVENTION

The present invention relates to a control system.

DESCRIPTION OF THE RELATED ART

Conventional control systems are constructed in such a manner that a management device and a controller are connected by a communication network, such as Ethernet (R), through a communication interface. The controller controls various machines and devices, such as a numerical controller for controlling a manufacturing machine, a robot controller for controlling a robot, and a programmable logic controller (PLC).

In acquiring various data from the numerical controller through the communication network, in the management device of a control system, a function is called for communication for each data expected to be acquired. If (1) coordinate values, (2) modal information, and (3) speed information are expected to be acquired, for example, it is necessary to execute three functions, as illustrated in FIG. 4, and perform communication to acquire the individual data (see, e.g., Japanese Patent Application Laid-Open No. 2002-366355).

The conventional method has a problem that communication requires a data packet for each data to be acquired, so that it takes time to acquire information that is finally necessary due to the communication overhead. In order to solve this problem, a method may be used in which a function for acquiring a plurality of pieces of data by a single communication session using a single data packet is created and a new communication format is created in accordance with it. In general, however, there are many pieces of information to be acquired from a controller, such as coordinate values, feed rate, spindle speed, parameter information, offset information, and alarm history. It is not realistic to create the function for acquiring all these pieces of information by a single communication session. On the other hand, there are various combinations of data that are required depending on the situation. Therefore, there arises another problem that the development costs increase in creating a different function and a different communication format for each combination of data acquired by a single communication session.

SUMMARY OF THE INVENTION

Accordingly, the object of the present invention is to provide a control system configured so that a plurality of pieces of data can be easily and flexibly acquired by a single communication session.

According to the present invention, the above problem is solved by mounting the control system with a function of transmitting/receiving a plurality of types of data together in a data acquisition request through a network. In the data grouping transmission/reception function of the present invention, a device that constitutes the control system is provided with a data grouping transmission/reception mode. If a plurality of data acquisition requests through the network are made in this mode, a single grouping request is created by grouping the individual data acquisition requests, and this grouping request is transmitted by a single communication session. Moreover, the device having received the grouping request acquires a plurality of pieces of data in response to the plurality of data acquisition requests included in the received request, creates the result of grouping of the acquired data, and transmits the grouping result as a response to the grouping request.

A control, system according to one embodiment of the present invention is configured so that at least one controller for controlling a machine and a management device configured to acquire control-related data from the controller, based on a command from a program, and manage the acquired data are connected through a network. The management device includes a command execution unit configured to read out and execute commands in the program, a grouping request creation unit configured to create a grouping request by grouping data acquisition requests based on a plurality of data acquisition request commands, out of the commands read from the command execution unit by the command execution unit, and transmit the grouping request to the controller, and a result acquisition unit. On the other hand, the controller comprises a request analysis unit configured to fetch a plurality of data acquisition requests from the grouping request received from the management device, a data acquisition unit configured to acquire control-related data corresponding individually to the plurality of data acquisition requests, and a grouping result creation unit configured to create a grouping result by grouping the control-related data acquired by the data acquisition unit. The result acquisition unit fetches result data corresponding individually to the data acquisition request commands from the grouping result received from the controller and stores the fetched result data into a memory.

The grouping request creation unit may create the grouping request as a single data packet.

The grouping result creation unit may create the grouping result as a single data packet.

A management device according to one embodiment of the present invention is connected to at least one controller for controlling a machine through a network and configured to acquire control-related data from the controller, based on a command from a program, and manage the acquired data. The management device includes a command execution unit configured to read out and execute commands in the program, a grouping request creation unit configured to create a grouping request by grouping data acquisition requests based on a plurality of data acquisition request commands, out of the commands read from the command execution unit by the command execution unit, and transmit the grouping request to the controller, and a result acquisition unit configured to fetch result data corresponding individually to the data acquisition request commands from a grouping result received from the controller and store the fetched result data into a memory.

A controller according to the one embodiment of the present invention is connected to a management device through a network and configured to control a machine. The controller includes a request analysis unit configured to fetch a plurality of data acquisition requests from a grouping request received from the management device, a data acquisition unit configured to acquire control-related data corresponding individually to the plurality of data acquisition requests, and a grouping result creation unit configured to create a grouping result by grouping the control-related data acquired by the data acquisition unit and transmit the grouping request to the controller.

According to the present invention, a plurality of pieces of data can be acquired by communication using a single data packet, so that the communication overhead can be reduced to shorten the communication time and the communication load on the network can be reduced, as compared with the case where a data packet for communication is created for each data acquisition.

Since a grouped acquisition function of the present invention can be used by only turning on a data grouping transmission/reception mode, a function and a new communication format need not be created for each data use form. Moreover, it is necessary only that ON/OFF processing for the data grouping transmission/reception mode be added to existing applications, so that the development costs can be reduced.

Furthermore, according to the present invention, necessary data can be selectively acquired from a huge amount of information in the controller, so that any combination of information can be acquired at a time.

DETAILED DESCRIPTION OF THE PREFERRED EMBODIMENTS

Figure 1:
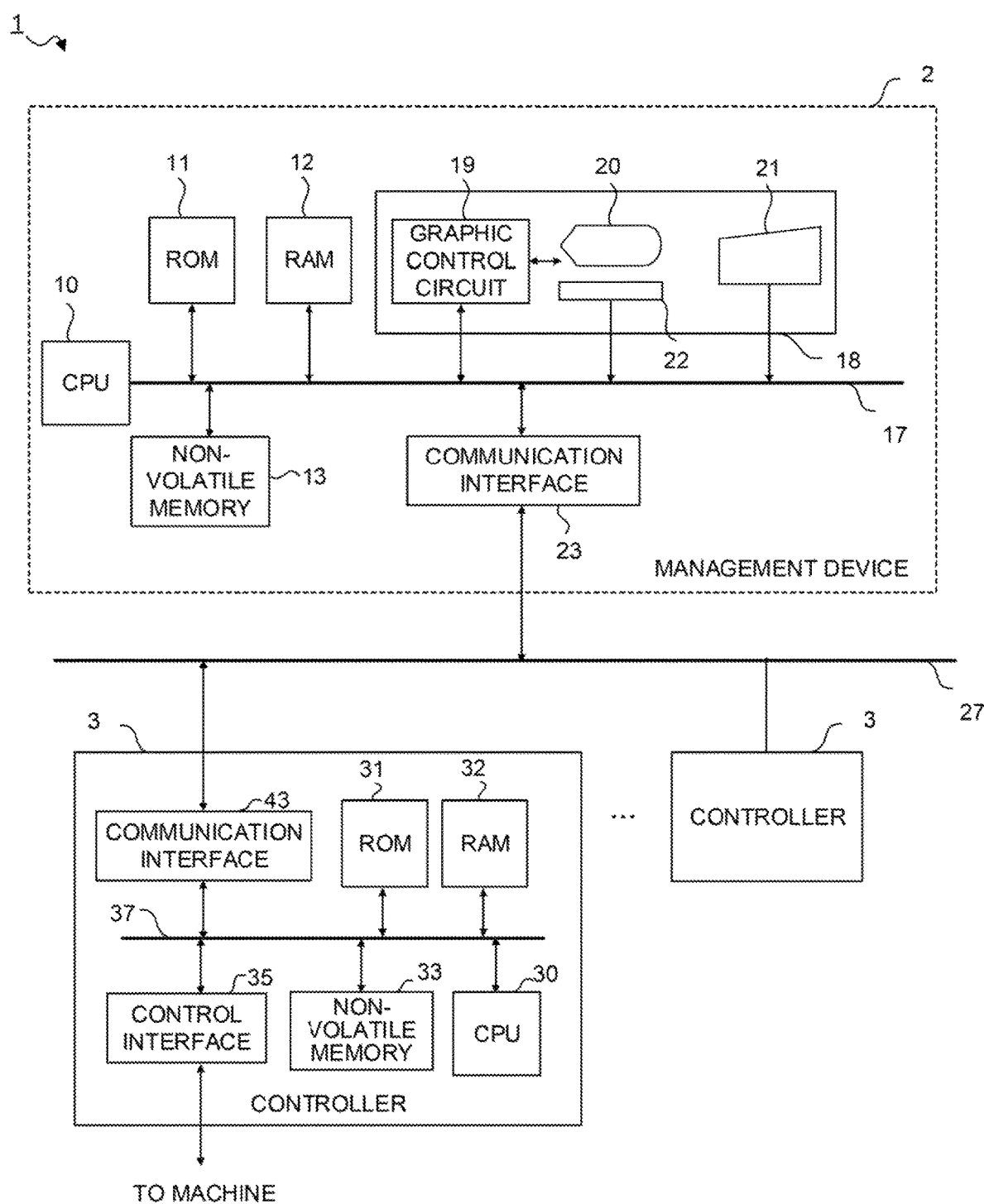
FIG. 1 is a schematic hardware configuration diagram showing principal parts of a control system according to one embodiment.

FIG. 1 is a schematic hardware configuration diagram showing principal parts of a control system according to one embodiment.

A control system 1 according to the present embodiment is constructed in such a manner that at least one controller 3 and a management device 2 for managing the controller 3 are connected by a wired/wireless network 27. In the control system 1 according to the present embodiment, the controller 3 controls a manufacturing device, robot, or the like (not shown), and a huge amount of information related to the control is generated as data and accumulated as required. Moreover, in the control system 1, the management device 2 acquires the data generated by the controller 3, if necessary, and uses it to manage the entire control system 1.

The management device 2 according to the present embodiment can be implemented as, for example, a personal computer or the like attached to the controller 3. Moreover, the management device 2 according to the present embodiment can be implemented as, for example, a cell computer or a host computer connected to the controller 3 through a network, a cloud server computer, or the like The management device 2 is mainly composed of a CPU 10. Constituent elements of the management device 2 are connected through a bus 17 and exchange data with one another via the bus 17. The CPU 10 controls the entire management device 2 according to a system program stored in a ROM 11. An EPROM, EEPROM, or the like is used for the ROM 11.

A DRAM or the like is used for a RAM 12, which stores temporary calculation data, display data, and the like. A CMOS or SRAM, which is backed up by a battery (not shown), is used for a non-volatile memory 13 and stores parameters and the like to be retained even after the power supply is turned off.

A user interface apparatus 16 is used to display data and graphics required for the operation of the management device 2 and receive a worker's manual operation input, data input, and the like. A graphic control circuit 19 converts digital signals, such as numerical data and graphic data, into raster signals for display and delivers them to a display device 20, which displays these numerical values and graphics. A liquid-crystal display device is mainly used for the display device 20.

An input device 21 comprises a key switch, a rotary switch, a keyboard, which is provided with numeric keys, symbolic keys, character keys, and function keys, and a pointing device such as a mouse.

A touch panel 22 has a function of detecting the touching and dragging operations by the worker. The touch panel 22 is disposed superimposed on the screen of the display device 20 and can detect, the worker's operations on software keys, software buttons, and software switches displayed on the screen of the display device 20. The touch panel 22 and the display device 20 may be combined into a single unit.

A communication interface 23 performs data communication with the controller 3 and the like connected to the wired/wireless network 27 through the network 27. A control program executed in the controller 3 as a managed object, information on the result of execution of the program, information related to signals acquired during the execution of program, and the like can be acquired through the communication interface 23, for example.

On the other hand, the controller 3 is mainly composed of a CPU 30. Constituent elements of the management device 3 are connected through a bus 37 and exchange data with one another via the bus 37. The CPU 30 controls the entire management device 3 according to a system program stored in a ROM 31. An EPROM, EEPROM, or the like is used for the ROM 31.

A DRAM or the like is used for a RAM 32, which stores temporary calculation data, display data, and the like. A CMOS or SRAM, which is backed up by a battery (not shown), is used for a non-volatile memory 33 and stores parameters and the like to be retained even after the power supply is turned off.

A control interface 35 is connected to various machines, such as a machine tool and a robot, and the controller 3 controls the machines through the control interface 35, acquires information on various parts of the machines, and detects and acquires the operation states of the machines by means of sensors (not shown).

A communication interface 43 performs data communication with the management device 2 and the like connected to the wired/wireless network 27 through the network 27.

Figure 2:
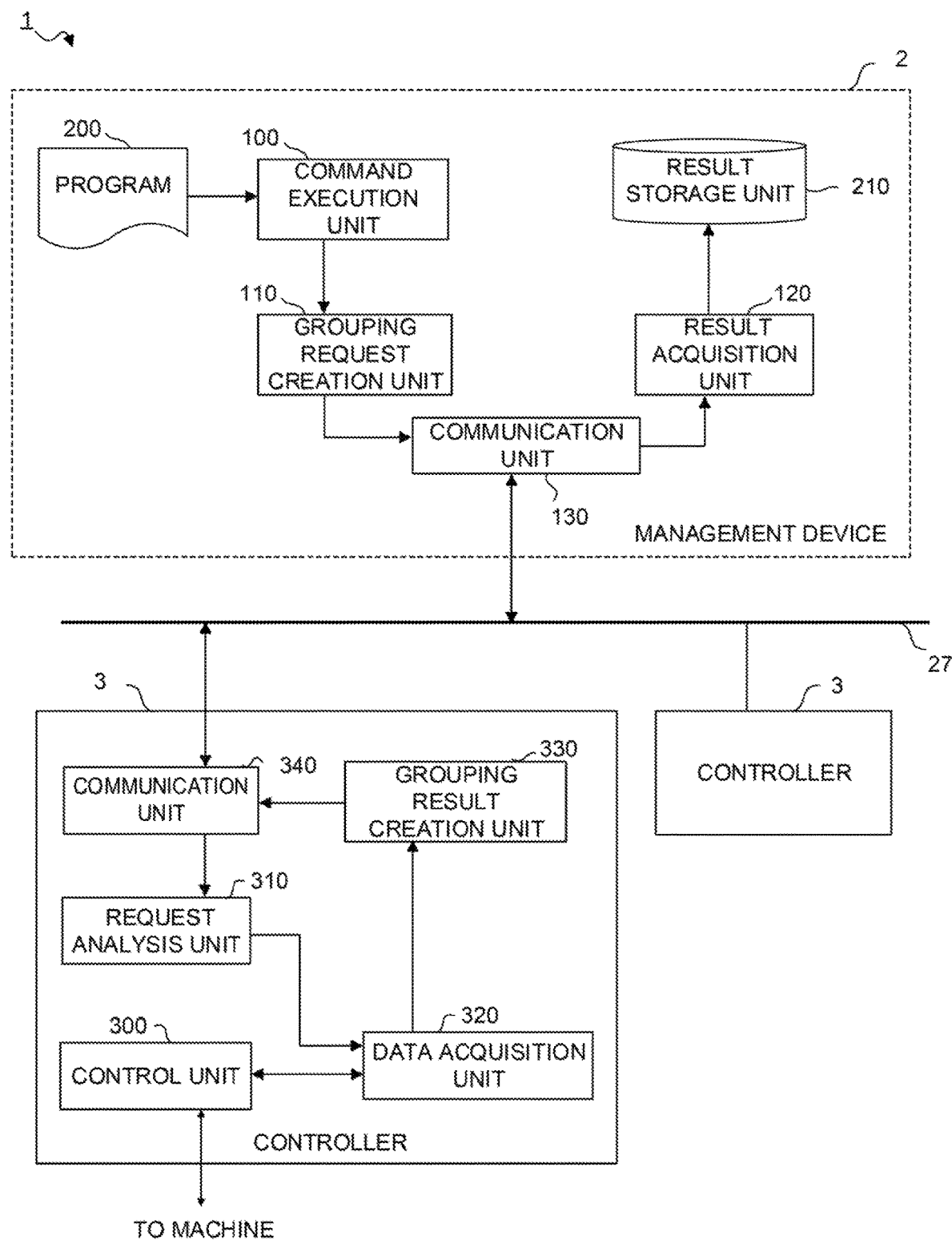
FIG. 2 is a schematic functional block diagram of the control system according to the one embodiment.

FIG. 2 is a schematic functional block diagram of a control system according to a first embodiment in the case where system programs for implementing a data grouping transmission/reception function are installed individually in the management device 2 and the controller 3 shown in FIG. 1.

Functional blocks shown in FIG. 2 are implemented as the CPU 10 of the management device 2 and the CPU 30 of the controller 3 shown in FIG. 1 individually execute the system programs for the data grouping transmission/reception function, thereby controlling the operations of the various parts of the management device 2 and the controller 3.

The management device 2 that constitutes the control system 1 of the present embodiment comprises a command execution unit 100, grouping request creation unit 110, result acquisition unit. 120, and communication unit 130, and a result storage unit 210 for storing the result acquired from the controller 3 is provided on a memory such as the RAM 12. While the management device 2 of the present embodiment is provided with a functional means for implementing functions of a conventional management device, besides the above-described functional means, a description thereof is omitted herein.

The command execution unit 100 sequentially reads out commands included in a program 200 to be executed, stored in the non-volatile memory 13, and controls the various parts of the management device 2 based on the read commands. The command execution unit 100 has two operation modes or states in which a data grouping transmission/reception mode is OFF and ON. Switching between these operation modes of the command execution unit 100 is performed, for example, when a data grouping transmission/reception mode switching command is read from the program.

When the command execution unit 100 reads out a data acquisition request command from the program with the data grouping transmission/reception mode OFF, it executes this command in the same manner as in the prior art and transmits a data acquisition request to the controller 3 as a data acquisition request, destination through the communication unit 130. When the command execution unit 100 reads out the data acquisition request command from the program with the data grouping transmission/reception mode OK, in contrast, it commands the grouping request creation unit 110 to create a grouping request based on the read data acquisition request command.

When the command execution unit 100 then reads out a grouping request transmission command from the program with the data grouping transmission/reception mode ON, it commands the grouping request creation unit 110 to transmit the created grouping request to the controller 3 as the data acquisition request destination through the communication unit 130.

Based on the command from the command execution unit 100, the grouping request creation unit 110 creates the grouping request by grouping a plurality of data acquisition requests. For example, the grouping request creation unit 110 creates the single grouping request (single data packet including the plurality of data acquisition requests) by grouping the data acquisition requests created based on the data acquisition request command. The grouping request creation unit 110 may be configured so that it previously stores the accepted data acquisition requests on a memory such as the RAM 12 and creates the single grouping request based on the stored data acquisition requests when it is commanded to transmit the grouping request to the data acquisition request destination. After transmitting the created grouping request to the data acquisition request destination, the grouping request creation unit 110 deletes the data acquisition requests stored on the memory so that data acquisition requests received thereafter can be stored for the creation of the next grouping request. In this way, a user who creates the program 200 can control the management device 2 so as to transmit the grouping request to the data acquisition request destination at any time.

The result acquisition unit 120 receives a result or a grouping result as a response to the data acquisition request or the grouping request from the data acquisition request destination through the communication unit 130 and stores it in the result storage unit 210. On receiving the grouping result from the data acquisition request destination, the result acquisition unit 120 fetches individual result data from the grouping result and stores the fetched result data in a predetermined area of the result storage unit 210. The individual result data stored in the result storage unit 210 are used, for example, by being displayed on the display device 20 or recorded in an external storage device (not shown) or the like according to the command from the program 200.

On the other hand, the controller 3 that constitutes the control system 1 of the present embodiment comprises a control unit 300, request analysis unit 310, data acquisition unit 320, grouping result creation unit 330, and communication unit 340. While the controller 3 of the present embodiment is provided with a functional means for implementing functions of a conventional controller, besides the above-described functional means, a description thereof is omitted herein.

The control unit 300 controls the machines according to programs (not shown) for machine control. The control unit 300 commands the machines to perform operations and also acquires information on various parts of the machines and the operation states of the machines.

The request analysis unit 310 analyzes the data acquisition request or the grouping request received through the communication unit 340 and commands the data acquisition unit 320 to acquire necessary data based on the result of the analysis. If the request analysis unit 310 receives a regular data acquisition request according to the prior art, it acquires requested data from the control unit 300 by commanding the data acquisition unit 320, in the same manner as in the prior art, and transmits the acquired data as a response to the data acquisition request to the request source of the data acquisition request through the communication unit 340. If the request analysis unit 310 receives the grouping request, in contrast, it fetches individual data acquisition requests from the received grouping request and commands the data acquisition unit 320 to acquire data requested by the individual data acquisition requests from the control unit 300.

The grouping result creation unit 330 creates the grouping result by grouping the data requested by the individual data acquisition requests included in the grouping request, which are acquired by the data acquisition unit 320, and transmits the created grouping result to the data acquisition request source through the communication unit 340. The grouping result creation unit 330 creates the single grouping request (single data packet including a plurality of pieces of data) by grouping the plurality of data requested by the individual data acquisition requests included in the grouping result.

Figure 3:
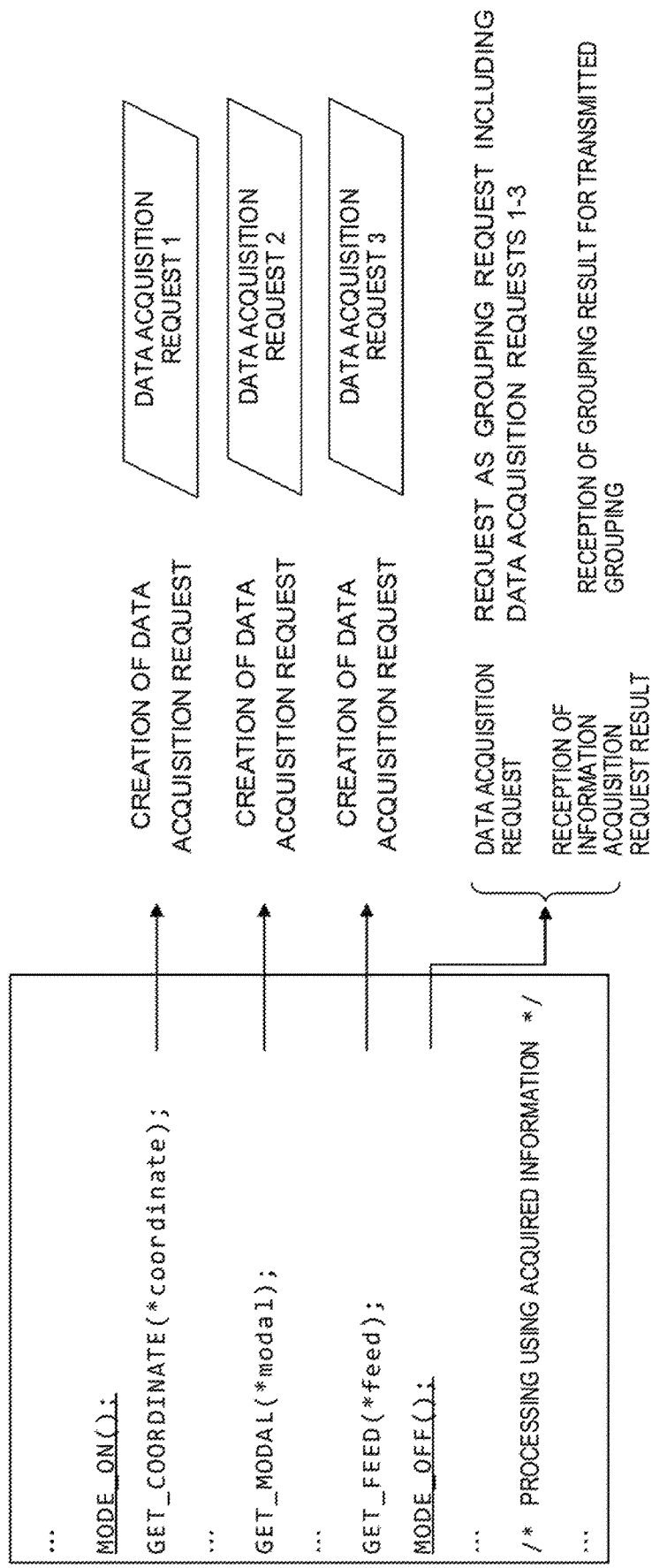
FIG. 3 is a diagram illustrating a program executed in the control system according to the one embodiment.
Figure 4:
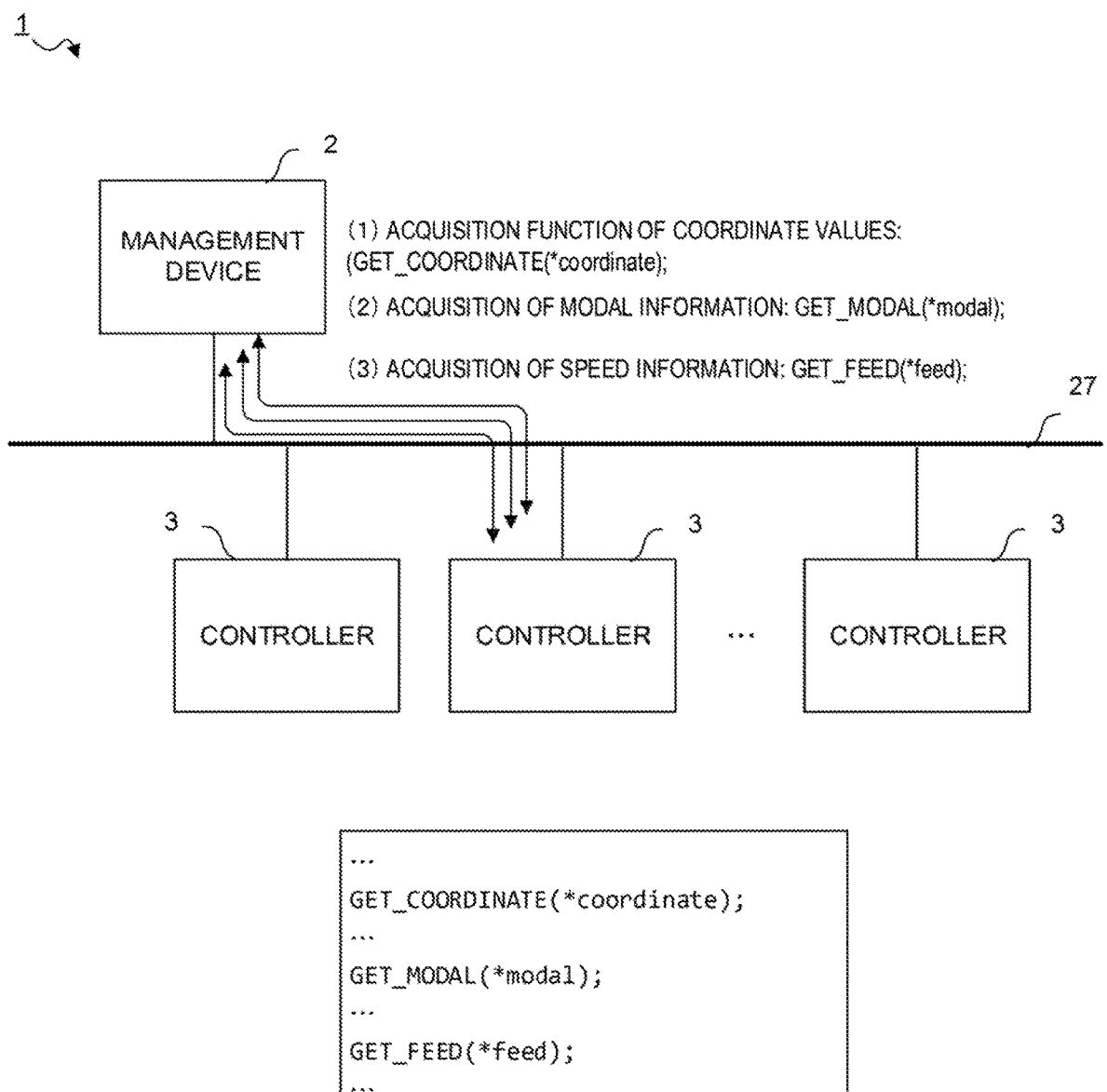
FIG. 4 is a diagram showing an example of acquisition of a plurality of pieces of data through a network according to the prior art.

FIG. 3 shows an example of the program 200 executed by the management device 2 according to the present embodiment.

In the example of FIG. 3, a command "MODE_ON" for turning on the data grouping transmission/reception mode and a command "MODE_OFF" for turning off the data grouping transmission/reception mode are used as data grouping transmission/reception mode switching commands. Moreover, in the example of FIG. 3, a coordinate value data acquisition command "GET_COORDINATE", modal information acquisition command "GET_MODAL", and speed information acquisition command "GET_FEED" are used as data acquisition request commands. In the example of FIG. 3, the command "MODE_OFF" is assumed to also serve as the grouping request transmission command. Furthermore, while a pointer variable (variable with *) is specified as an argument of each data acquisition request command in the example of FIG. 3, this is intended to order the storage of data returned as a response to each data acquisition request command in a position on the memory (predetermined position in the result storage unit 210) indicated by the pointer variable specified by the argument.

When the program illustrated in FIG. 3 is executed, the data grouping transmission/reception mode is turned on at the point in time when the command "MODE_ON" is read from the command execution unit 100. When the command execution unit 100 then reads the command "GET_COOR-DINATE" with the data grouping transmission/reception mode ON, it commands the grouping request creation unit 110 to create a data acquisition request 1 for acquiring coordinate value data, when the command execution unit 100 reads the command "GET_MODAL", thereafter, it commands the grouping request creation unit 110 to create a data acquisition request 2 for acquiring modal information. Moreover, when the command execution unit 100 reads the command "GET_FEED", it commands the grouping request creation unit 110 to create a data acquisition request 3 for acquiring speed information. When the command execution unit 100 then reads the command "MODE_OFF", it commands the grouping request creation unit 110 to create and transmit a grouping request based on the data acquisition requests created so far. When the grouping result is acquired by the result acquisition unit 120, the command execution unit 100 turns off the data grouping transmission/reception mode.

While the three pieces of data including the coordinate value data, modal information, and speed information are acquired in the example illustrated in FIG. 3, the data to be acquired may be of types that can be acquired from the conventional controller 3. The data to be acquired can be various ones such as data on the control axis/spindle (coordinate values, feed rate, spindle speed, etc.), data on the control program (registered program list, running program information, etc.), numerical control-related data (parameter information, offset information, etc.), history-related data (alarm history, operation history, etc.), PMC-related data (programmable machine controller (PMC) signals, timer information, etc.), and other data (system information, modal information, etc.). Moreover, the number of acquired data is not limited to three, and a desired number of data can be grouped together as required so that the result can be received as the acquisition requests.

The control system of the present embodiment is constructed so that the data acquisition requests requested with the data grouping transmission/reception mode ON are sent together as a single grouping request. Therefore, conventionally described commands can be used directly as the data acquisition request commands if the data grouping transmission/reception mode switching command and the grouping request transmission command (the data grouping transmission/reception mode switching command doubles as this in the example of FIG. 3) are added to the commands described in the program 200. Thus, a conventional program can also deal with the data grouping transmission/reception function if it is minimally modified.

While an embodiment of the present invention has been described herein, the invention is not limited to the above-described embodiment and may be suitably modified and embodied in various forms.

The invention claimed is:

1. A control system in which at least one controller for controlling a machine and a management device configured to acquire control-related data from the controller, based on a command from a program, and manage the acquired data are connected through a network,
   the management device comprising:
      a command execution unit,
      a grouping request creation unit,
      a result acquisition unit,
      wherein the command execution unit is configured to read out commands in the program and the commands comprise a command grouping mode:
         in response to the command grouping mode being OFF, sequentially execute commands in the program by sequentially transmitting regular requests to the controller, and
         in response to the command grouping mode being ON, instruct the grouping request creation unit to create a grouping request,
      wherein, in response to the instruction from the command execution unit, the grouping request creation unit is configured to create a grouping request by grouping data acquisition requests based on a plurality of data acquisition request commands, out of the commands read from the program by the command execution unit, and transmit the grouping request to the controller,
   the controller comprising:
      a request analysis unit,
      a data acquisition unit, and
      a grouping result creation unit,
      wherein the request analysis unit is configured to:
         in response to receiving the regular requests, command the data acquisition unit to acquire control-related data corresponding individually to the regular requests, and transmit the acquired control-related data to the management device, and
         in response to receiving the grouping request, fetch the data acquisition requests from the grouping request, command the data acquisition unit to acquire control-related data requested by the data acquisition requests fetched from the grouping request, command the grouping result creation unit to create a grouping result, and transmit the grouping result to the management device.

2. The control system according to claim 1, wherein the grouping request creation unit creates the grouping request as a single data packet.

3. The control system according to claim 1, wherein the grouping result creation unit creates the grouping result as a single data packet.

4. A management device connected to at least one controller for controlling a machine through a network and configured to acquire control-related data from the controller, based on a command from a program, and manage the acquired data, the management device comprising:
   a command execution unit;
   a grouping request creation unit,
   a result acquisition unit,
   wherein the command execution unit is configured to read out commands in the program and the commands comprise a command grouping mode:
      in response to the command grouping mode being OFF, sequentially execute commands in the program by sequentially transmitting regular requests to the controller, and in response to the command grouping mode being ON, instruct the grouping request creation unit to create a grouping request, wherein, in response to the instruction from the command execution unit, the grouping request creation unit is configured to create a grouping request by grouping data acquisition requests based on a plurality of data acquisition request commands, out of the commands read from the program by the command execution unit, and transmit the grouping request to the controller; and a result acquisition unit configured to fetch result data corresponding individually to the data acquisition request commands from a grouping result received from the controller and store the fetched result data into a memory, the grouping result including acquired control-related data requested by the data acquisition requests fetched from the grouping request.

5. A controller connected to a management device through a network and configured to control a machine, the controller comprising:

a request analysis unit,
a data acquisition unit, and
a grouping result creation unit,
wherein the request analysis unit is configured to:
in response to receiving regular requests, command the data acquisition unit to acquire control-related data corresponding individually to the regular requests, and transmit the acquired control-related data to the management device, and in response to receiving a grouping request, fetch the data acquisition requests from the grouping request, command the data acquisition unit to acquire control-related data requested by the data acquisition requests fetched from the grouping request, command the grouping result creation unit to create a grouping result and transmit the grouping request to the management device, wherein the regular requests and the grouping request are created by the management device in response to a command grouping mode that is a command read from a program.

* * * * *